United States Patent
Son

(10) Patent No.: US 8,626,061 B2
(45) Date of Patent: Jan. 7, 2014

(54) ISOLATION DISTANCE CALCULATION METHOD AND APPARATUS FOR AVOIDANCE OF INTERFERENCE SIGNAL IN WIRELESS COMMUNICATION REPEATER SYSTEM

(75) Inventor: Ho Kyung Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 12/914,397

(22) Filed: Oct. 28, 2010

(65) Prior Publication Data

US 2011/0151771 A1 Jun. 23, 2011

(30) Foreign Application Priority Data

Dec. 17, 2009 (KR) .................... 10-2009-0125963
Feb. 4, 2010 (KR) .................... 10-2010-0010348

(51) Int. Cl.
*H04B 7/185* (2006.01)
(52) U.S. Cl.
USPC ............ 455/13.1; 455/11.1; 455/7; 370/226; 370/246; 370/293; 370/315
(58) Field of Classification Search
USPC ............... 455/3.02, 427, 428, 430, 431, 7–9, 455/11.1, 12.1, 13.1, 13.2, 14–17; 340/425.1; 370/226, 293, 246, 274, 370/279, 315, 316, 492, 501
See application file for complete search history.

(56) References Cited

U.S. PATENT DOCUMENTS

| | | | | |
|---|---|---|---|---|
| 3,626,282 A * | 12/1971 | Brewer | | 324/536 |
| 3,760,418 A * | 9/1973 | Cash et al. | | 342/6 |
| 3,845,472 A * | 10/1974 | Buchanan et al. | | 370/222 |
| 5,864,579 A * | 1/1999 | Briskman | | 375/130 |
| 6,040,759 A * | 3/2000 | Sanderson | | 725/130 |
| 6,934,511 B1 * | 8/2005 | Lovinggood et al. | | 455/11.1 |
| 7,194,210 B2 * | 3/2007 | Uda et al. | | 398/159 |
| 7,764,224 B1 * | 7/2010 | Anderson | | 342/357.27 |
| 8,031,818 B2 * | 10/2011 | Lee et al. | | 375/344 |
| 2004/0067745 A1 * | 4/2004 | Belsak, Jr. | | 455/402 |
| 2005/0085267 A1 * | 4/2005 | Lemson et al. | | 455/562.1 |
| 2007/0159382 A1 * | 7/2007 | Joo et al. | | 342/353 |
| 2007/0222579 A1 * | 9/2007 | Berkman | | 340/538 |
| 2007/0268846 A1 * | 11/2007 | Proctor et al. | | 370/279 |
| 2008/0278342 A1 | 11/2008 | Kates | | |
| 2009/0103492 A1 * | 4/2009 | Altshuller et al. | | 370/331 |
| 2009/0140852 A1 * | 6/2009 | Stolarczyk et al. | | 340/539.13 |
| 2010/0165892 A1 * | 7/2010 | Cha et al. | | 370/280 |
| 2010/0279602 A1 * | 11/2010 | Larsson et al. | | 455/7 |
| 2010/0284446 A1 * | 11/2010 | Mu et al. | | 375/211 |
| 2011/0080295 A1 * | 4/2011 | Nakamura | | 340/577 |
| 2011/0116531 A1 * | 5/2011 | Gore et al. | | 375/213 |
| 2011/0312269 A1 * | 12/2011 | Judd et al. | | 455/11.1 |

FOREIGN PATENT DOCUMENTS

| | | |
|---|---|---|
| JP | 2004-056315 A | 2/2004 |
| KR | 10-2007-0117125 A | 12/2007 |
| KR | 2009-0060699 A | 6/2009 |
| KR | 10-2009-0103515 A | 10/2009 |

* cited by examiner

*Primary Examiner* — Dominic E Rego
(74) *Attorney, Agent, or Firm* — Rabin & Berdo, P.C.

(57) ABSTRACT

Provided is a method and apparatus for calculating an isolation distance that is a distance where an interference phenomenon does not occur between wireless repeater apparatuses. The isolation distance calculating apparatus may include: an interference signal calculator to calculate a magnitude of an interference signal included in a particular band by detecting a signal of the particular band extracted from a received radio signal of a wireless repeater apparatus; and an isolation distance calculator to calculate a necessary isolation distance for cancelling interference between the wireless repeater apparatus and another wireless repeater apparatus, based on a predetermined allowable interference signal level and the magnitude of the interference signal.

15 Claims, 3 Drawing Sheets

ISOLATION DISTANCE CALCULATION METHOD AND APPARATUS FOR AVOIDANCE OF INTERFERENCE SIGNAL IN WIRELESS COMMUNICATION REPEATER SYSTEM

CROSS-REFERENCE TO RELATED APPLICATIONS

This application claims the benefit of Korean Patent Application No. 10-2009-0125963, filed on Dec. 17, 2009, and Korean Patent Application No. 10-2010-0010348, filed on Feb. 4, 2010, in the Korean Intellectual Property Office, the disclosures of which are incorporated herein by reference.

BACKGROUND

1. Field of the Invention

The present invention relates to a method and apparatus for calculating an isolation distance that is a distance where an interference phenomenon does not occur between wireless repeater apparatuses.

2. Description of the Related Art

As a code division multiple access (CDMA) wireless mobile telephone service becomes domestically popular, there is an increasing desire to increase a wireless network environment of a provider and to expand a system capacity. Due to a domestic geographical characteristic and a dense population, when designing an optimal wireless environment, there is required a countermeasure for a shadow area or a dead spot where a propagation path between a base station and a terminal is disconnected.

Accordingly, with respect to the shadow region where a radio wave may not easily reach, such as a propagation disconnection region caused by mountains, buildings, or other landmarks, a tunnel, an underground parking lot, and the like, many wireless repeater apparatuses have been installed to service the shadow region by amplifying signals of a base station so that the signals of the base station may reach a terminal positioned in the shadow region, and to connect signals of the terminal so that the signals of the terminal may reach the base station.

However, as many wireless repeater apparatuses are installed, a distance between the wireless repeater apparatuses has become close. An interference phenomenon where a wireless repeater apparatus being close to another wireless repeater apparatus by at least one predetermined distance receives signals from the other wireless repeater apparatus may occur.

Accordingly, when installing a new wireless repeater apparatus, there is a desire for an apparatus and method that may verify an isolation distance that is a distance where an interference phenomenon does not occur between the new wireless repeater apparatus and an existing installed wireless repeater apparatus.

SUMMARY

An aspect of the present invention provides an apparatus and method that may calculate an isolation distance suitable for an allowable interference signal level using an interference signal between wireless repeater apparatuses, and may display the value of the calculated isolation distance and thereby may avoid the interference signal.

Another aspect of the present invention also provides an apparatus and method that may display a value of an isolation distance suitable for an allowable interference signal level and thereby install a wireless repeater apparatus in an optimal place where interference from another wireless repeater apparatus does not occur, and thereby may provide a more efficient and stable wireless service.

According to an aspect of the present invention, there is provided an apparatus for calculating an isolation distance, including: an interference signal calculator to calculate a magnitude of an interference signal included in a particular band by detecting a signal of the particular band extracted from a received radio signal of a wireless repeater apparatus; and an isolation distance calculator to calculate an isolation distance necessary for cancelling interference between the wireless repeater apparatus and another wireless repeater apparatus, based on a predetermined allowable interference signal level and the magnitude of the interference signal.

The isolation distance calculator may calculate a necessary isolation by decreasing the allowable interference signal level by the calculated magnitude of the interference signal, and may calculate the isolation distance by applying, to the necessary isolation, a predetermined model according to a place where the wireless repeater apparatus is installed.

According to another aspect of the present invention, there is provided a method of calculating an isolation distance, including: receiving a radio signal; extracting a signal of a particular band by filtering the radio signal; calculating a magnitude of an interference signal included in the particular band by detecting the signal of the particular band; and calculating an isolation distance necessary for cancelling interference between the wireless repeater apparatus and another wireless repeater apparatus, based on a predetermined allowable interference signal level and the magnitude of the interference signal.

EFFECT

According to embodiments of the present invention, it is possible to avoid an interference signal between wireless repeater apparatuses by calculating an isolation distance suitable for an allowable interference signal level using the interference signal, and by displaying a value of the calculated isolation distance.

According to embodiments of the present invention, it is possible to provide a more efficient and stable wireless service by displaying a value of an isolation distance suitable for an allowable interference signal level and by installing a wireless repeater apparatus in an optimal place where interference of another wireless repeater apparatus does not occur.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
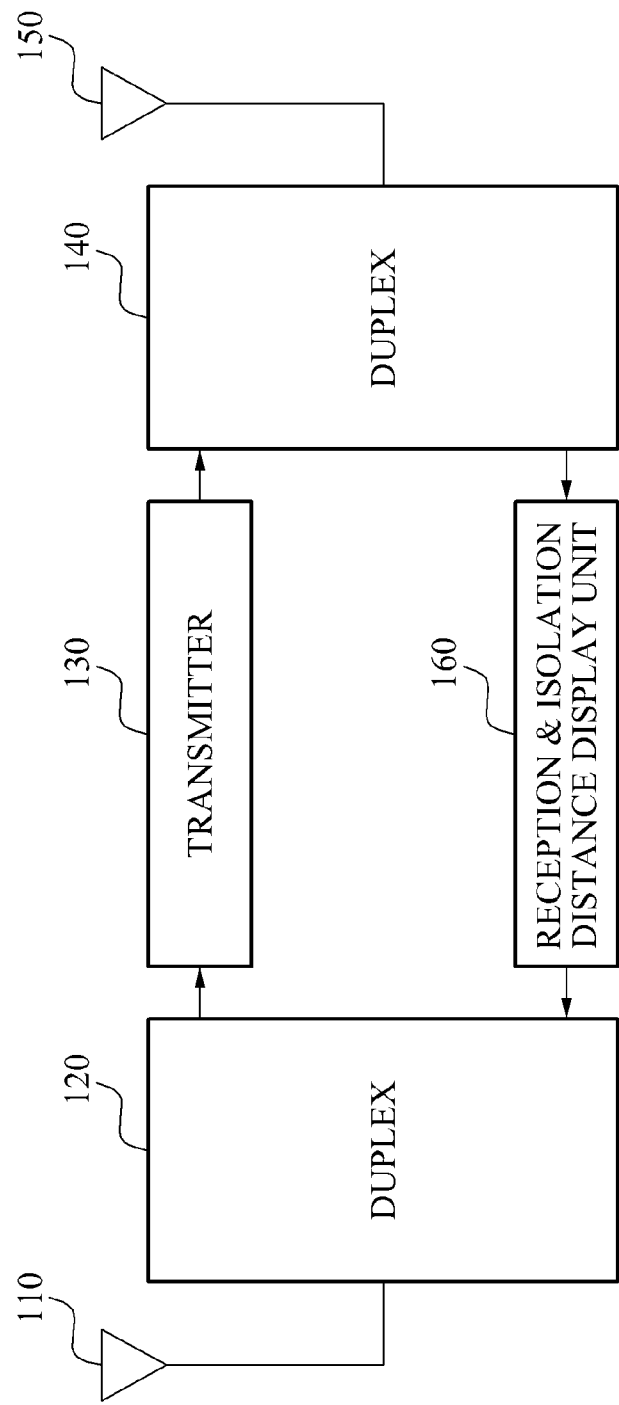
FIG. 1 is a block diagram illustrating an example of a wireless repeater apparatus including an isolation distance calculating apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating an example of a wireless repeater apparatus including an isolation distance calculating apparatus according to an embodiment of the present invention.

Referring to FIG. 1, the wireless repeater apparatus may include a donor antenna 110, a pair of duplexes 120 and 140, a transmitter 130, a coverage antenna 150, and a reception and isolation distance display unit 160.

The donor antenna 110 may receive a base station signal from a base station (not shown), and may transmit the base station signal to the transmitter 130 via the duplex 120.

The transmitter 130 may amplify and filter the base station signal received from the donor antenna 110, and may transmit the amplified and filtered base station signal to the coverage antenna 150 via the duplex 140.

Specifically, the transmitter 130 may perform a low noise amplification for the base station signal transmitted via the duplex 120, and may down-convert the amplified base station signal to an intermediate frequency (IF) band by mixing the amplified base station signal and an oscillation frequency of a local oscillator.

The transmitter 130 may extract a desired frequency band from the IF band using a surface acoustic wave (SAW) filter having an excellent shirt characteristic.

The transmitter 130 may generate the amplified and filtered base station signal by up-converting and amplifying the extracted frequency band and generate, and may transmit the amplified and filtered base station signal to the coverage antenna 150.

The coverage antenna 150 may transmit, to a shadow region, the base station signal transferred from the transmitter 130 via the duplex 140.

Also, the coverage antenna 150 may receive a terminal signal transmitted from a terminal (not shown) positioned in the shadow region, and a repeater signal transmitted from another wireless repeater apparatus, and may transmit a received signal to the reception and isolation distance display unit 160 via the duplex 140. In this instance, the signal received by the coverage antenna 150 may be a radio frequency (RF) signal.

Figure 2:
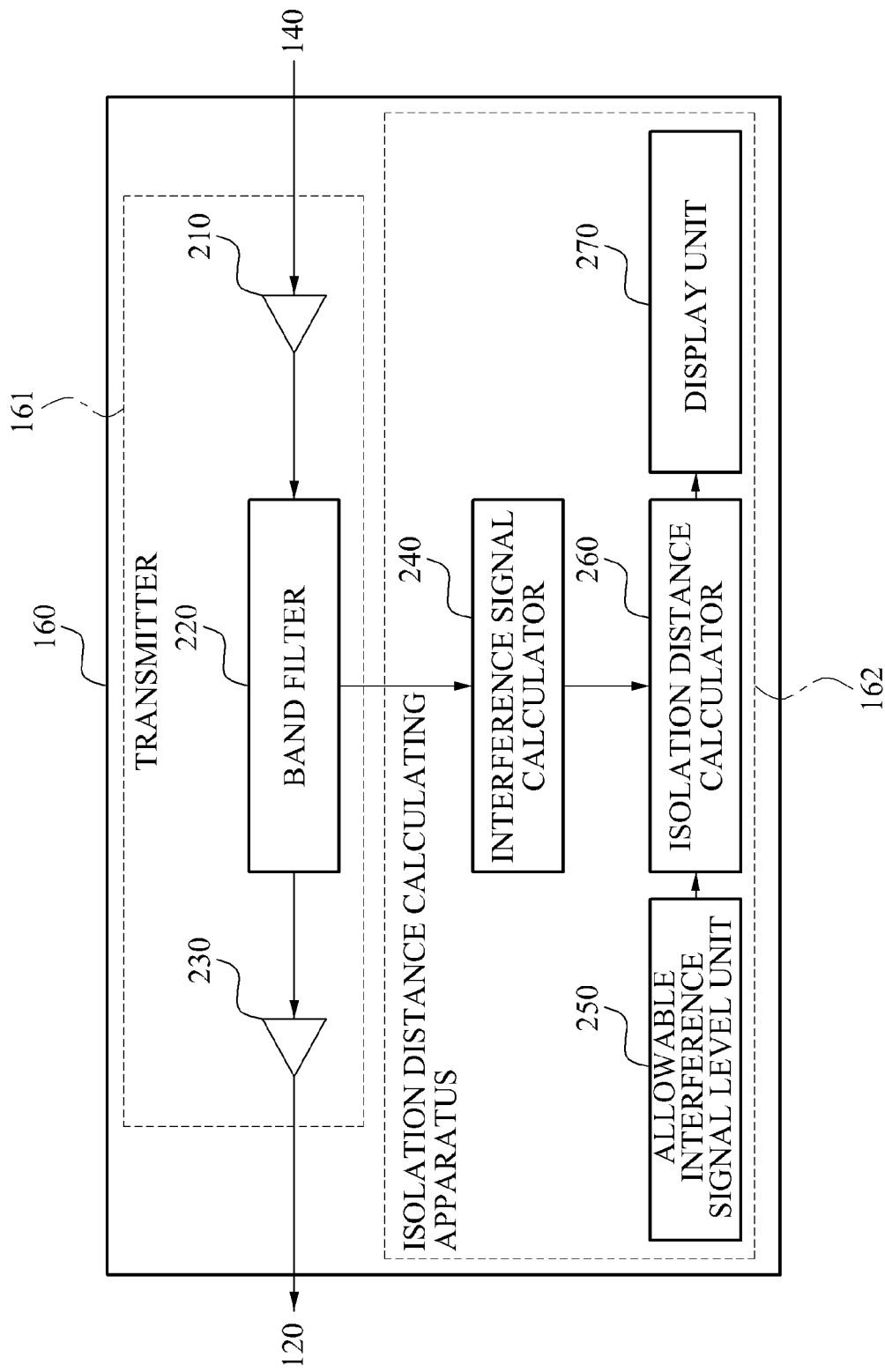
FIG. 2 is a block diagram illustrating an example of a reception and isolation distance display unit of FIG. 1.

Referring to FIG. 2, the reception and isolation distance display unit 160 may include a transmitter 161 to amplify and filter the RF signal and then to transmit the amplified and filtered RF signal to the base station via the donor antenna 110, and an isolation distance calculating apparatus 162 to verify, using the RF signal, whether the wireless repeater apparatus is sufficiently isolated from another wireless repeater apparatus, and to display a value of a necessary isolation distance of the wireless repeater apparatus when the wireless repeater apparatus is insufficiently isolated from the other wireless repeater apparatus.

Hereinafter, the reception and isolation distance display unit 160 will be further described with reference to FIG. 2.

FIG. 2 is a block diagram illustrating an example of the reception and isolation distance display unit 160 of FIG. 1.

Referring to FIG. 2, the reception and isolation distance display unit 160 may include a low noise amplifier (LNA) 210, a band filter 220, a high power amplifier (HPA) 230, an interference signal calculator 240, an allowable interference signal level unit 250, an isolation distance calculator 260, and a display unit 270.

In this instance, the LNA 210, the band filter 220, and the HPA 230 may be included in the transmitter 161. The interference signal calculator 240, the allowable interference signal level unit 250, the isolation distance calculator 260, and the display unit 270 may be included in the isolation distance calculating apparatus 162.

Although the reception and isolation distance display unit 160 is configured by integrating the transmitter 161 and the isolation distance calculating apparatus 162 into a single apparatus, the isolation distance calculating apparatus 162 may be provided as an isolation apparatus. In this case, the isolation distance calculating apparatus 162 may be combined with the transmitter 161, and receive, from the transmitter 161, a signal of a particular band extracted by the band filter 220 and thereby calculate an isolation distance.

The LNA 210 may perform a low noise amplification for an RF signal received and then transferred via the antenna 150, and transmit the amplified RF signal to the band filter 220. The band filter 220 may extract the signal of the particular band by filtering the amplified RF signal. In this instance, the band filter 220 may transmit the extracted signal of the particular band to the HPA 230 and the interference signal calculator 240.

The HPA 230 may amplify the extracted signal of the particular band and transmit the amplified signal of the particular band to the donor antenna 110.

The interference signal calculator 240 may calculate a magnitude of an interference signal included in the particular band by detecting the extracted signal of the particular band.

The allowable interference signal level unit 250 may transmit, to the isolation distance calculator 260, an allowable interference signal level that is a level corresponding to a magnitude of an interference signal allowable within a range where a performance of the wireless repeater apparatus is not degraded. As used herein, the allowable interference signal level that the allowable interference signal level unit 250 may transmit to the to the isolation distance calculator 260, may also be referred to as a "used allowable interference signal level."

The allowable interference signal level unit 250 may receive the allowable interference signal level from a user operating the wireless repeater apparatus, and transmit the allowable interference signal level to the isolation distance calculator 260. For example, when the wireless repeater apparatus is initialized, the allowable interference signal level unit 250 may softwarely or physically receive the allowable interference signal level from the user.

When the allowable interference signal level is not input from the user, the allowable interference signal level unit 250 may transmit a basic allowable interference signal level to the isolation distance calculator 260.

The basic allowable interference signal level may be calculated according to the following Equation 1.

$$\text{Basic allowable interference signal level (dBm)} = -174 \text{ [dBm/Hz]} + 10 \log B + NF \text{ [dB]} - 6 \text{ dB} \quad \text{[Equation 1]}$$

Here, B may denote a noise bandwidth of the wireless repeater apparatus, NF may denote a noise index of the wireless repeater apparatus, and −174 [dBm/Hz] may denote a white noise power of 1 [Hz] bandwidth.

Also, −6 dB may denote a protection ratio (UN) that is a reference to apply the allowable interference signal level.

The isolation distance calculator 260 may calculate an isolation distance necessary for cancelling interference between the wireless repeater apparatus and another wireless repeater apparatus, based on the allowable interference signal level transmitted from the allowable interference signal level unit 250 and the magnitude of the interference signal calculated by the interference signal calculator 240.

Specifically, the isolation distance calculator 260 may verify whether the magnitude of the interference signal calculated by the interference signal calculator 240 is greater than the allowable interference signal level transmitted by the allowable interference signal level unit 250.

When the magnitude of the interference signal is less than or equal to the allowable interference signal level, the isolation distance calculator 260 may calculate the isolation distance as zero.

Also, when the magnitude of the interference signal is greater than the allowable interference signal level, the isolation distance calculator 260 may calculate a necessary isolation (NI) by applying the allowable interference signal level and the magnitude of the interference signal according to the following Equation 2.

$$NI\ (dB) = \text{allowable interference signal level (dBm)} - \text{magnitude of interference signal (dBm)} \quad \text{[Equation 2]}$$

The isolation distance calculator 260 may calculate the isolation distance by applying, to the NI, a predetermined model according to a place where the wireless repeater apparatus is installed.

For example, when the wireless repeater apparatus is installed indoor, the isolation distance calculator 260 may calculate the isolation distance by applying a free space loss model to the NI.

Specifically, the isolation distance calculator 260 may calculate the isolation distance according to the following Equation 3.

$$D = 10^{\frac{NI - 62.4 - 20\log(f)}{20}} \quad \text{[Equation 3]}$$

Here, f may denote a central frequency of the wireless repeater apparatus and be indicated based on a unit of 'MHz', and D may denote a necessary isolation distance and be indicated based on a unit of 'm'.

When a value of the isolation distance calculated by the isolation distance calculator 260 is greater than or equal to zero, the display unit 270 may display the value of the isolation distance or may display information regarding that the magnitude of the interference signal is greater than an allowable interference signal level.

Figure 3:
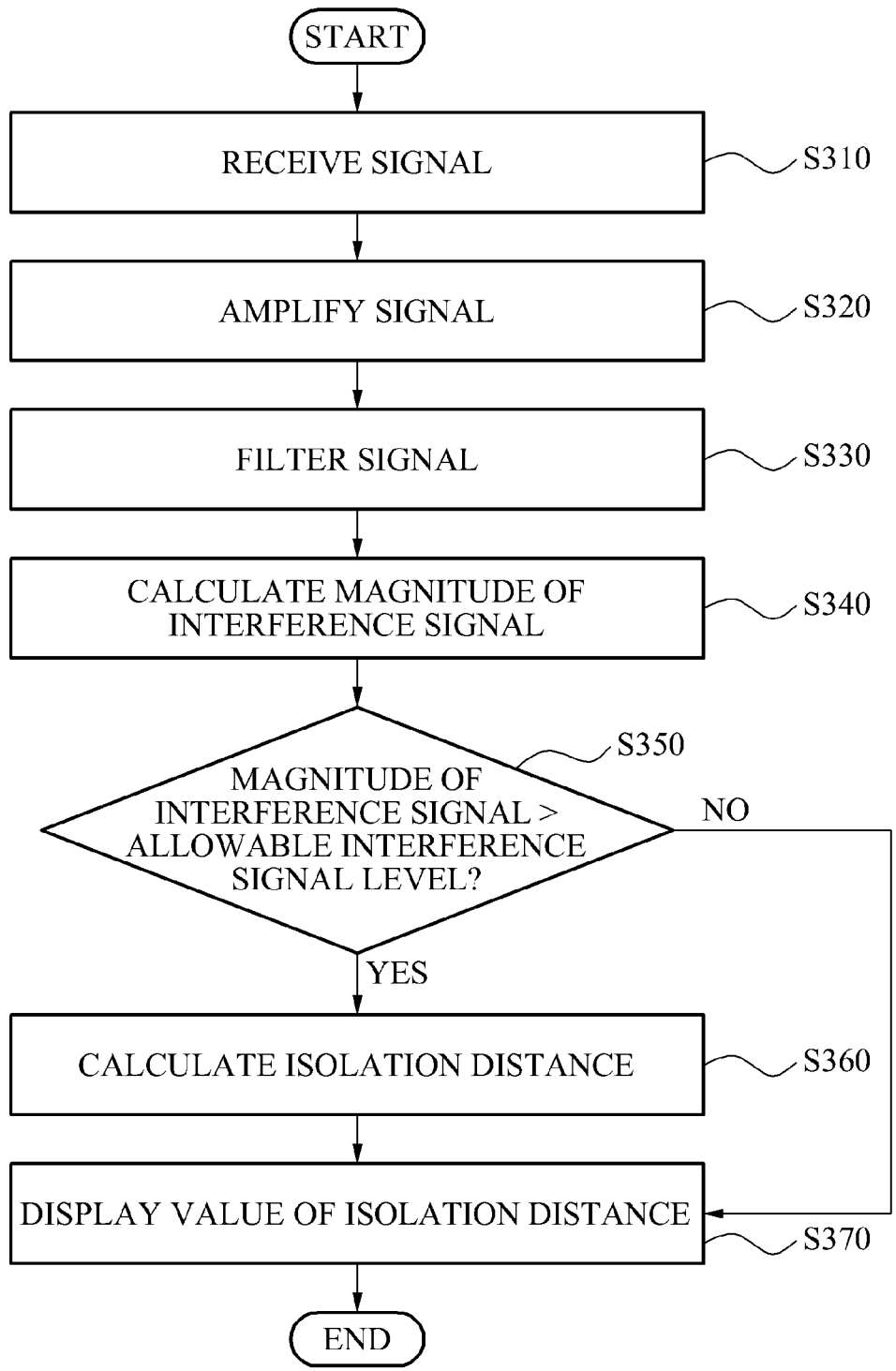
FIG. 3 is a flowchart illustrating a method of calculating an isolation distance according to an embodiment of the present invention.

FIG. 3 is a flowchart illustrating a method of calculating an isolation distance according to an embodiment of the present invention.

In operation S310, the LNA 210 may receive a signal transferred from the coverage antenna 150.

In operation S320, the LNA 210 may perform a low noise amplification for the received signal and transmit the amplified signal to the band filter 220.

In operation S330, the band filter 220 may extract a signal of a particular band by filtering the amplified signal.

In operation S340, the interference signal calculator 240 may calculate a magnitude of an interference signal included in the particular band by detecting the extracted signal of the particular band.

In operation S350, the isolation distance calculator 260 may verify whether the calculated magnitude of the interference signal is greater than an allowable interference signal level.

When the calculated magnitude of the interference signal is less than or equal to the allowable interference signal level, the isolation distance calculator 260 may calculate the isolation distance as zero and then perform operation S370.

In operation S360, the isolation distance calculator 260 may calculate a necessary isolation distance of a wireless repeater apparatus based on the allowable interference signal level transmitted from the allowable interference signal level unit 250 and the magnitude of the interference signal calculated by the interference signal calculator 240.

Specifically, the isolation distance calculator 260 may calculate an NI according to Equation 2, and may calculate the isolation distance by applying, to the calculated NI, a predetermined model according to a place where the wireless repeater apparatus is installed.

In operation S370, when the value of the calculated isolation distance is greater than or equal to zero, the display unit 270 may display a value of the isolation distance or may display information regarding that the interference signal is greater than the allowable interference signal level.

When the magnitude of the interference signal is verified to be less than or equal to the allowable interference signal level in operation S350, the display unit 270 may display the value of the isolation distance as zero.

According to embodiments of the present invention, it is possible to avoid an interference signal between wireless repeater apparatuses by calculating an isolation distance suitable for an allowable interference signal level using the interference signal, and by displaying a value of the calculated isolation distance.

According to embodiments of the present invention, it is possible to provide a more efficient and stable wireless service by displaying a value of an isolation distance suitable for an allowable interference signal level and by installing a wireless repeater apparatus in an optimal place where interference of another wireless repeater apparatus does not occur.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for calculating an isolation distance, comprising:
    an interference signal calculator to calculate a magnitude of an interference signal included in a particular band by detecting a signal of the particular band, the particular band being extracted from a received radio signal that is received by a first wireless repeater apparatus; and
    an isolation distance calculator to calculate a necessary isolation distance for cancelling interference between the first wireless repeater apparatus and a second wireless repeater apparatus during wireless communication of the first wireless repeater apparatus, based on a used allowable interference signal level and the magnitude of the interference signal, wherein:
    when an input allowable interference signal level is input from a user, the used allowable interference signal level is determined based on the input allowable interference signal level, and
    when the input allowable interference signal level is not input from the user, the used allowable interference signal level is determined based on a basic allowable interference signal level.

2. The apparatus of claim 1, wherein the isolation distance calculator calculates a necessary isolation by decreasing the used allowable interference signal level by the magnitude of the interference signal, and calculates the necessary isolation distance by applying, to the necessary isolation, a predetermined model according to a place where the first wireless repeater apparatus is installed.

3. The apparatus of claim 2, wherein when the first wireless repeater apparatus is installed indoor, the isolation distance calculator calculates the necessary isolation distance by applying a free space loss model, as the predetermined model, to the necessary isolation.

4. The apparatus of claim 1, wherein:
when the input allowable interference signal level is input from the user, the input allowable interference signal level is transmitted to the isolation distance calculator, and
when the input allowable interference signal level is not input from the user, the basic allowable interference signal level is transmitted to the isolation distance calculator.

5. The apparatus of claim 4, wherein the basic allowable interference signal level corresponds to a value that is obtained by subtracting a protection ratio from a sum of 10 times a log value of a noise bandwidth of the first wireless repeater apparatus, a noise index of the isolation distance calculating apparatus, and a white noise power of 1 Hz bandwidth.

6. The apparatus of claim 1, wherein:
the isolation distance calculator verifies whether the magnitude of the interference signal is greater than the used allowable interference signal level, and
when the magnitude of the interference signal is less than or equal to the used allowable interference signal level, the isolation distance calculator calculates the necessary isolation distance as zero.

7. The apparatus of claim 6, further comprising:
a display unit to display, when a value of the calculated necessary isolation distance is greater than or equal to zero,
the value of the calculated necessary isolation distance, or
information indicating that the magnitude of the interference signal is greater than the used allowable interference signal level.

8. The apparatus of claim 1, wherein the isolation distance calculator calculates the necessary isolation distance so as to cancel interference between the first wireless repeater apparatus and second wireless repeater apparatus during wireless communication therebetween.

9. A method of calculating an isolation distance, comprising:
receiving a radio signal;
extracting a signal of a particular band of the radio signal by filtering the radio signal;
calculating a magnitude of an interference signal included in the particular band by detecting the extracted signal of the particular band; and
calculating a necessary isolation distance for cancelling interference between a first wireless repeater apparatus and a second wireless repeater apparatus during wireless communication of the first wireless repeater apparatus, based on a used allowable interference signal level and the magnitude of the interference signal, wherein:
when an input allowable interference signal level is input from a user, the used allowable interference signal level is determined based on the input allowable interference signal level, and when the input allowable interference signal level is not input from the user, the used allowable interference signal level is determined based on a basic allowable interference signal level.

10. The method of claim 9, wherein the calculating the necessary isolation distance comprises:
verifying whether the magnitude of the interference signal is greater than the used allowable interference signal level;
calculating a necessary isolation by decreasing the used allowable interference signal level by the magnitude of the interference signal when the magnitude of the interference signal is greater than the used allowable interference signal level;
calculating the necessary isolation distance as zero when the magnitude of the interference signal is less than or equal to the used allowable interference signal level; and
calculating the necessary isolation distance by applying, to the necessary isolation, a predetermined model according to a place where the first wireless repeater apparatus is installed.

11. The method of claim 10, wherein the calculating the necessary isolation distance by applying the predetermined model comprises calculating the necessary isolation distance by applying a free space loss model to the necessary isolation.

12. The method of claim 9, further comprising:
verifying whether the input allowable interference signal level is input from the user,
wherein the calculating the necessary isolation distance comprises calculating the necessary isolation distance based on the input allowable interference signal level and the magnitude of the interference signal when the input allowable interference signal level is input from the user, and calculating the necessary isolation distance based on the basic allowable interference signal level and the magnitude of the interference signal when the input allowable interference signal level is not input from the user.

13. The method of claim 12, wherein the first wireless repeater apparatus performs the step of receiving a radio signal, and an isolation distance calculating apparatus performs the steps of extracting a signal, calculating a magnitude and calculating a necessary isolation distance,
further wherein the basic allowable interference signal level corresponds to a value that is obtained by subtracting 6 decibel (dB) from a sum of 10 times a log value of a noise bandwidth of the first wireless repeater apparatus, a noise index of the isolation distance calculating apparatus, and a white noise power of 1 Hz bandwidth.

14. The method of claim 9, wherein in calculating the necessary isolation distance, the necessary isolation distance is calculated so as to cancel interference between the first wireless repeater apparatus and the second wireless repeater apparatus during wireless communication therebetween.

15. A method of calculating an isolation distance, comprising:
receiving a radio signal;
extracting a signal of a particular band of the radio signal by filtering the radio signal;
calculating a magnitude of an interference signal included in the particular band by detecting the extracted signal of the particular band;
calculating a necessary isolation distance for cancelling interference between a first wireless repeater apparatus and a second wireless repeater apparatus during wireless communication of the first wireless repeater apparatus, based on a used allowable interference signal level and the magnitude of the interference signal; and verifying whether a value of the isolation distance is greater than or equal to zero; and when the value of the isolation distance is greater than or equal to zero, displaying the value of the isolation distance, or displaying information indicating that the magnitude of the interference signal is greater than the used allowable interference signal level.

* * * * *